(12) United States Patent
Kimura et al.

(10) Patent No.: US 8,589,966 B2
(45) Date of Patent: Nov. 19, 2013

(54) OPTICAL PICKUP

(75) Inventors: Katsuhiko Kimura, Kasumigaura (JP); Jun Hato, Fujisawa (JP); Zhiyan Gao, Kawasaki (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/430,831

(22) Filed: Mar. 27, 2012

(65) Prior Publication Data

US 2012/0297403 A1 Nov. 22, 2012

(30) Foreign Application Priority Data

May 19, 2011 (JP) .................... 2011-112120

(51) Int. Cl.
*G11B 7/09* (2006.01)

(52) U.S. Cl.
USPC ............................................. 720/681

(58) Field of Classification Search
USPC ............................................. 720/681
See application file for complete search history.

(56) References Cited

U.S. PATENT DOCUMENTS

| | | | | |
|---|---|---|---|---|
| 7,287,264 B2 * | 10/2007 | Akanuma | ............ | 720/681 |
| 7,562,372 B2 * | 7/2009 | Shimokawa et al. | ......... | 720/683 |
| 7,940,610 B2 * | 5/2011 | Yoshida et al. | ............ | 369/44.15 |
| 2004/0004774 A1 * | 1/2004 | Fujita | ............ | 359/814 |
| 2004/0128679 A1 * | 7/2004 | Wade | ............ | 720/681 |
| 2005/0166217 A1 * | 7/2005 | Van Rooij et al. | ............ | 720/672 |
| 2006/0225087 A1 * | 10/2006 | Shimokawa et al. | ......... | 720/683 |

FOREIGN PATENT DOCUMENTS

| JP | 2008-041182 A | 2/2008 |
|---|---|---|
| JP | 2010-040067 A | 2/2010 |

OTHER PUBLICATIONS

JP Office Action in JP App. No. 2011-112120, dated Jul. 2, 2013.

\* cited by examiner

*Primary Examiner* — Mark Blouin
(74) *Attorney, Agent, or Firm* — Mattingly & Malur, PC

(57) ABSTRACT

An optical pickup whose thickness is small and power consumption is low is provided, in which these advantages are achieved by increasing the driving force generated in the tilt coil in an objective lens driving apparatus and by making the thickness of the objective lens driving apparatus to be small. In an optical pickup including: an objective lens for condensing light onto an optical disc; a lens holder to which the objective lens has been attached; a focusing coli, a tracking coil, and a tilt coil, which have been attached to the lens holder; and a reflection mirror for reflecting light toward the optical axis of the objective lens, the tilt coil is made to have a shape in which the tilt coil is not brought into contact with the side of the reflection mirror, the side being near to the objective lens.

6 Claims, 7 Drawing Sheets

OPTICAL PICKUP

CLAIM OF PRIORITY

The present application claims priority from Japanese patent application serial No. 2011-112120 filed on May 19, 2011, the content of which is hereby incorporated by reference into this application

BACKGROUND OF THE INVENTION

1. Field of the Invention

The present invention relates to an optical pickup that reads the information recorded on the recording surface of an optical disc and records information on an optical disc.

2. Description of the Related Art

A general objective lens driving apparatus provided in the optical pickup in an optical disc drive is formed of: a lens holder in which an objective lens is mounted; a focusing coil, a tracking coil, and a tilt coil, which are attached to the lens holder; supporting members for supporting a moving part including the lens holder and these coils; a yoke; and a magnet.

When a driving current is supplied to the focusing coil, the moving part is driven, by electromagnetic force generated by an action with the magnetic flux from the magnet, in the focusing direction in which the moving part moves close to or away from the optical disc surface. Similarly, when a driving current is supplied to the tracking coil, the moving part is driven, by the electromagnetic force generated by an action with the magnetic flux from the magnet, in the tracking direction that is the radial direction of an optical disc. When a driving current is supplied to the tilt coil, the moving part is rotationally driven, by the magnetic force generated by an action with the magnetic flux from the magnet, in the radial tilt direction whose rotational axis is oriented toward the tangential direction of the optical disc.

A conventional example of such an objective lens driving apparatus is disclosed, for example, in Japanese Patent Publication Application No. 2010-40067. A configuration is described in Japanese Patent Publication Application No. 2010-40067, in which an objective lens driving apparatus is provided with a pair of tilt coils each having an approximately rectangular tube shape, which rotationally drive a lens holder in the radial tilt direction.

Because information equipment in each of which an optical disc drive is mounted, such as personal computers, are progressively being small in size and thin, optical disc drives and optical pickups are required to be thin. A reduction in power consumption is also required so that the information equipment can be used for a long time when carried.

In order to reduce the power consumption in an objective lens driving apparatus, it is needed to increase the driving force that is generated, in each of a focusing coil, tracking coil, and tilt coil, per current supplied to each of the coils.

In the aforementioned Japanese Patent Publication Application No. 2010-40067, however, it is only made that the tilt coil is formed into an approximately rectangular tube shape, and accordingly it is not sufficiently taken into consideration that the driving force generated in the tilt coil is increased.

An object of the present invention is to provide an optical pickup whose thickness is small and power consumption is low, these being achieved by increasing the driving force generated in the tilt coil in an objective lens driving apparatus and by making the thickness of the objective lens driving apparatus to be small.

SUMMARY OF THE INVENTION

The aforementioned object can be achieved by an optical pickup comprising: an objective lens for condensing light onto an optical disc; a lens holder to which the objective lens has been attached; a focusing coli, a tracking coil, and a tilt coil, which have been attached to the lens holder; and a reflection mirror for reflecting light toward the optical axis of the objective lens, in which the tilt coil is made to have a shape in which the tilt coil is not brought into contact with the side of the reflection mirror, the side being near to the objective lens.

Alternatively, for the aforementioned object, it is preferable to assume that part of the tilt coil on the end side of the reflection mirror, the end being near to the objective lens, is a first coil portion and part of the tilt coil on the other end side thereof is a second coil portion, and to make the length of the second coil portion to be larger than that of the first coil portion.

Alternatively, for the aforementioned object, it is preferable to make the tilt coil have a trapezoidal shape.

Alternatively, for the aforementioned object, it is preferable that, when viewed from the optical axis direction of the objective lens, the first coil portion is provided at a position spaced apart from the reflection mirror, and that the second coil portion is provided at a position where part of the second coil portion near to the optical axis of the objective lens is overlapped with the reflection mirror.

Alternatively, for the aforementioned object, it is preferable that, when viewed from the tangential direction of the optical disc when the lens holder moves to the lowest side in the focusing direction, the first coil portion is spaced apart from the reflection mirror, and that part of the second coil portion near to the optical axis of the objective lens is provided at a position where the part thereof is overlapped with the reflection mirror.

Alternatively, for the aforementioned object, it is preferable that one piece of the tilt coil is provided near to the outer circumference in the radial direction of the optical disc with respect to the optical axis of the objective lens.

Alternatively, for the aforementioned object, it is preferable that two pieces of the tilt coil are provided near to the outer circumference and near to the inner circumference in the radial direction of the optical disc, and that the number of turns of the tilt coil near to the outer circumference is larger than that of the tilt coil near to the inner circumference .

According to the present invention, an optical pickup whose thickness is small and power consumption is low can be provided by increasing the driving force generated in the tilt coil in an objective lens driving apparatus and by achieving a small thickness of the objective lens driving apparatus.

DETAILED DESCRIPTION OF THE PREFERRED EMBODIMENTS

Hereinafter, embodiments of the present invention will be described with reference to accompanying drawings.
[Embodiment1]

Hereinafter, an optical pickup according to the present invention will be described.

Figure 1:
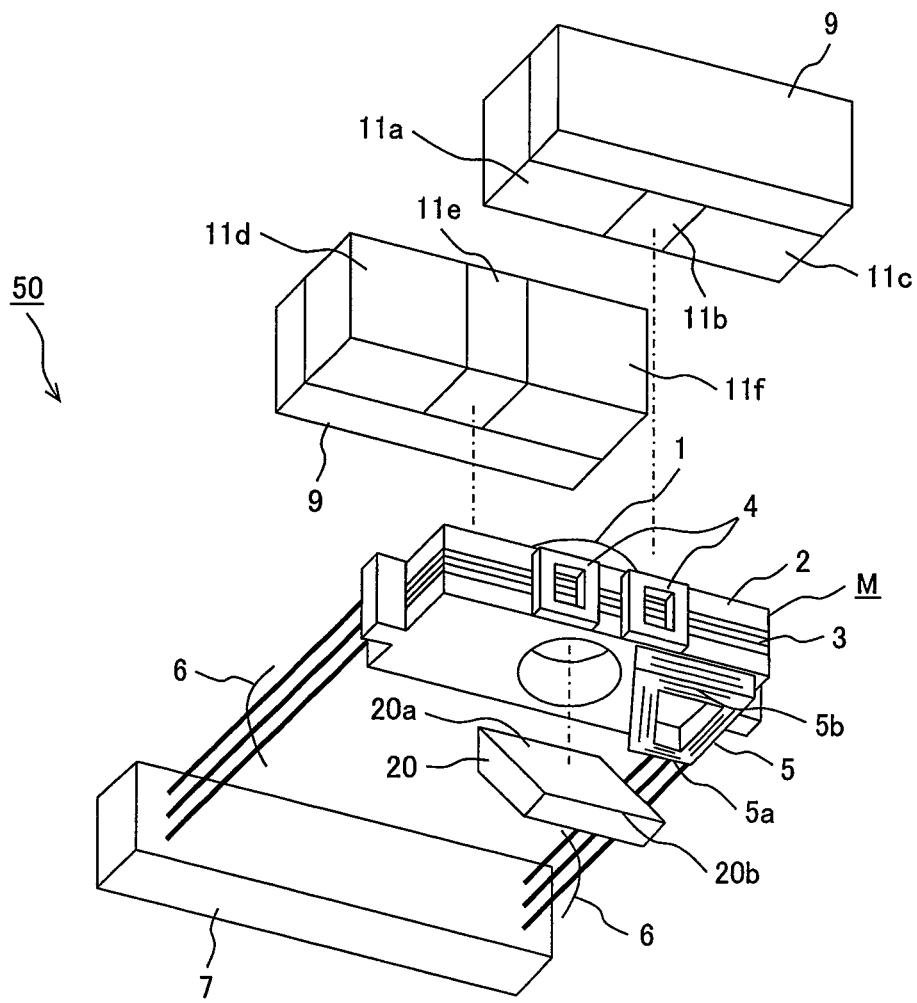
FIG. 1 is a perspective view of an optical pickup and an objective lens driving apparatus according to an embodiment of the present invention.
Figure 1:
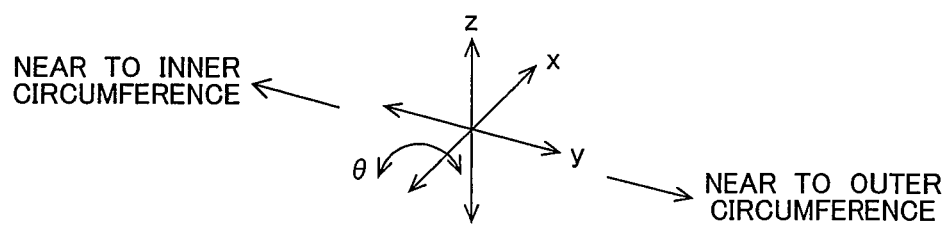
Figure 2:
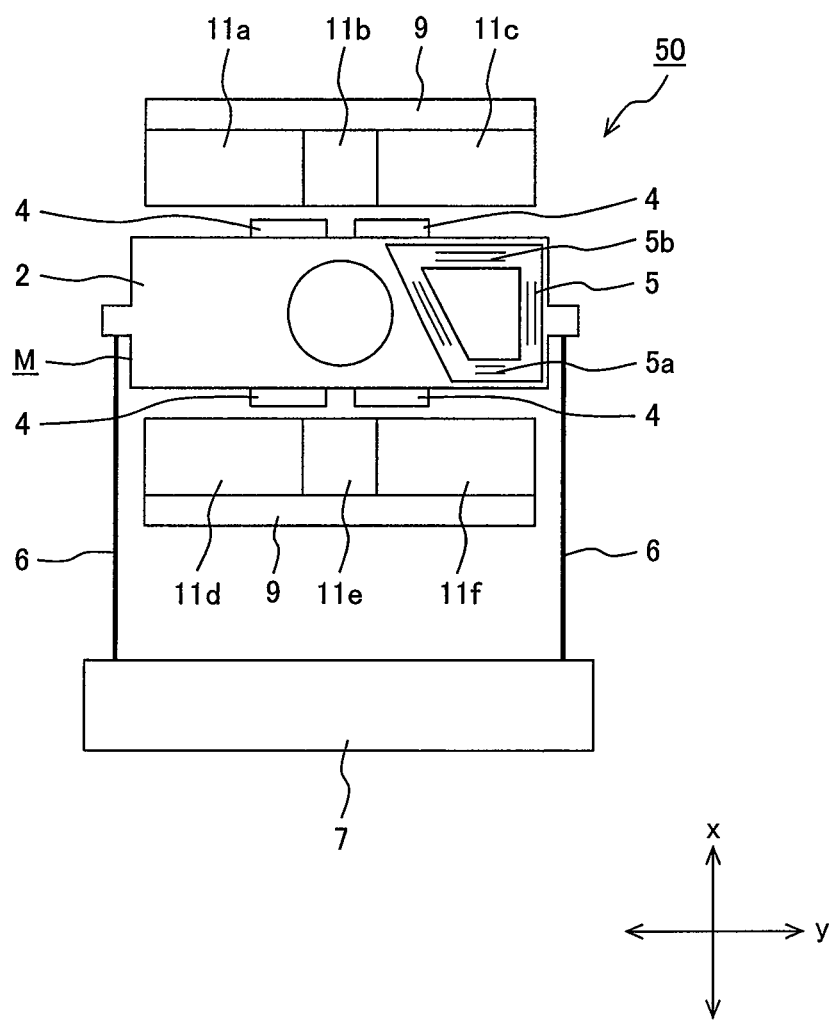
FIG. 2 is a bottom view of the objective lens driving apparatus illustrated in FIG. 1.
Figure 3:
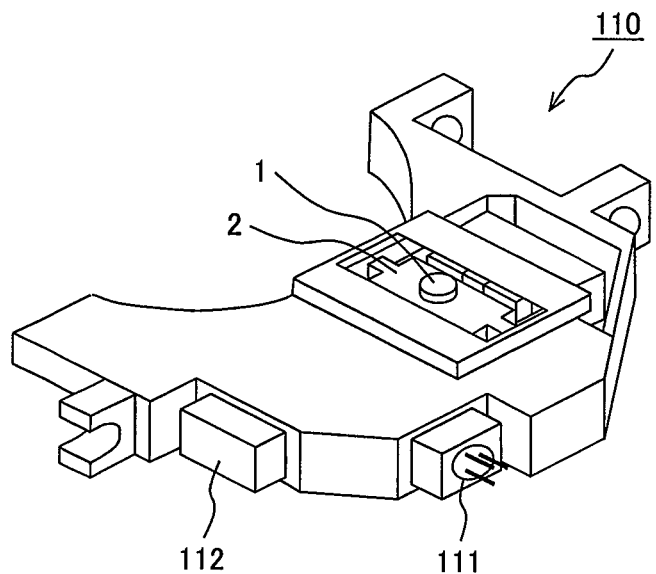
FIG. 3 is a perspective view of the optical pickup according to the embodiment of the invention.

FIG. 1 is a perspective view of an optical pickup and an objective lens driving apparatus according to an embodiment of the invention, when viewed from below. FIG. 2 is a bottom view of the objective lens driving apparatus illustrated in FIG. 1. FIG. 3 is a perspective view of the optical pickup according to the embodiment of the invention.

In FIGS. 1 through 3, z direction in the views is the optical axis direction of an objective lens 1, which is a focusing direction in which the objective lens 1 is moved close to or away from a non-illustrated optical disc. In this focusing direction, it is assumed that the side near to the optical disc is the upside and the side away therefrom is the downside.

y direction is the radial direction of the optical disc, which is a tracking direction in which the objective lens 1 is positioned with respect to the tracks of the optical disc. x direction is a direction perpendicular to both of y direction and z direction, which is the tangential direction of the optical disc. θ direction is the rotational direction around X axis, which becomes a radial tilt direction indicating an inclination of the optical disc in the radial direction.

As illustrated in FIG. 1, the objective lens 1 is mounted on the upper surface of a lens holder 2. A focusing coil 3 is formed with the optical axis of the objective lens 1 being a winding axis, and is attached to the lens holder 2. A tracking coil 4 is formed with the tangential direction of the optical disc being a winding axis, and is attached to two side surfaces of the lens holder 2, the two side surfaces being parallel to the focusing direction and the tracking direction.

A tilt coil 5 is formed with the optical axis of the objective lens 1 being a winding axis, and is attached to the lower surface of the lens holder 2. The tilt coil 5 has, in a plane perpendicular to the optical axis of the objective lens 1, two coil portions 5a and 5b that are parallel to the radial direction of the optical disc. One piece of the tilt coil 5 is attached near to the outer circumference in the radial direction of the optical disc with respect to the optical axis of the objective lens 1.

One end of each of a supporting member 6 is fixed to the lens holder 2 and the other end thereof is fixed to a fixing part 7. A moving part M including the objective lens 1, lens holder 2, focusing coil 3, tracking coil 4, and tilt coil 5 is supported by the supporting members 6 in a displaceable manner with respect to the fixing part 7. Each of the focusing coil 3, tracking coil 4, and tilt coil 5 is electrically connected to one end of each of the supporting member 6 by solder, etc.

Three magnets 11a, 11b, and 11c and those 11d, 11e, and 11f are respectively arranged on both sides respectively facing two side surfaces of the lens holder 2, the two side surfaces respectively being parallel to the focusing direction and the tracking direction, so that they are attached to a yoke 9 that is a magnetic body.

A reflection mirror 20 is arranged below the lens holder 2 to reflect a laser beam from a laser emitting device 111, which is provided in an optical pickup 110 illustrated in FIG. 3, toward the optical axis of the objective lens 1. A laser beam emitted from the laser emitting device 111, which is provided in the optical pickup 110, is condensed onto the optical disc by the objective lens 1. The condensed laser beam is reflected on the optical disc and then passes through the objective lens 1 on the lens holder 2, to be incident into a photo detector 112 provided in the optical pickup 110.

In FIG. 1, the reflection mirror 20 is fixed by a dedicated mounting member not illustrated in a state of being always inclined (approximately 45°). In addition, as illustrated in FIG. 1, an end of the reflection mirror 20, which is closest to the lens holder 2, is indicated by 20a, while the other end thereof that is farthest therefrom is indicated by 20b (hereinafter, referred to as an end 20a and an end 20b).

On the other hand, as explained above, the tilt coil 5 illustrated in FIG. 1 has two coil portions parallel to the tracking direction, one of which located on the end 20a side of the reflection mirror 20, the end 20a being near to the objective lens 1, is indicated by a first coil portion 5a; and the other of which is indicated by a second coil portion 5b. In such a tilt coli 5, the length of the second coil portion 5b is larger than that of the first coil portion 5a, and hence the shape of the tilt coil 5 is apparently trapezoidal.

The winding shape of the tilt coil 5 has been described as being trapezoidal in the present embodiment; however, this should not been limited to a trapezoid, but a shape obtained by cutting out part of a quadrangle or an L-shape obtained by combining quadrangles may be acceptable. In the case, the corner of the bend of the wirings naturally has an arched shape. That is, the tilt coil 5 may have any shape as far as the tilt coil 5 is not brought into contact with the end 20a of the reflection mirror 20.

Figure 4:
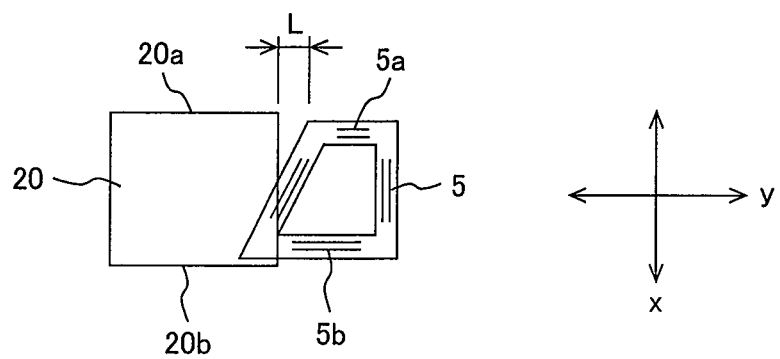
FIG. 4 is a view illustrating the positional relationship between a tilt coil and a reflection mirror according to the embodiment of the invention.

FIG. 4 is a view illustrating the positional relationship between the tilt coil and the reflection mirror according to the embodiment of the present invention.

In FIG. 4, the first coil portion 5a of the tilt coil 5 is spaced apart from the reflection mirror 20 by a distance L in the tracking direction, by which the first coil portion 5a of the tilt coil 5 is shorter than the second coil portion 5b thereof. On the other hand, part of the second coil portion 5b of the tilt coil 5, the part being near to the optical axis of the objective lens 1, is arranged at a position where the part thereof is overlapped with the reflection mirror 20.

That is, the first coil portion 5a is positioned close to the end 20a of the reflection mirror 20 that has been attached in an inclined manner, the end 20a being near to the objective lens 1, and the second coil portion 5b is positioned so as to enter a large space formed on the end 20b side of the reflection mirror 20, the end 20b being farthest from the objective lens 1. Thereby, the second coil portion 5b can be made large by just that much.

Figure 5A:
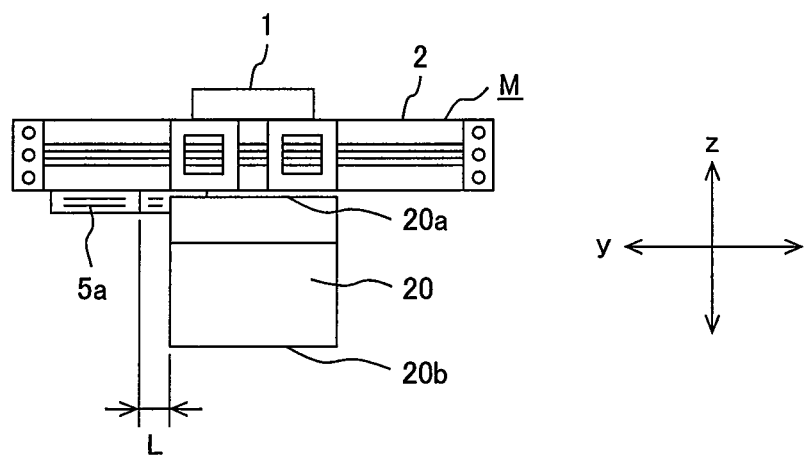
FIGS. 5A and 5B are views illustrating the positional relationship between a moving part and the reflection mirror according to the embodiment of the invention.
Figure 5B:
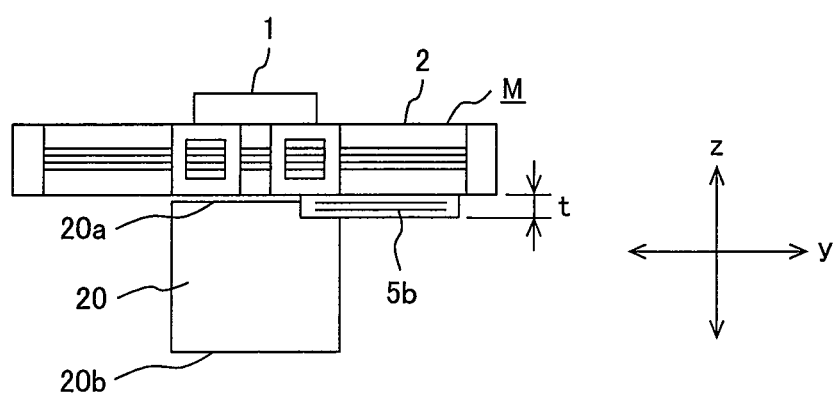

FIGS. 5A and 5B are views illustrating the positional relationship between the moving part and the reflection mirror according to the embodiment of the present invention. In FIG. 5A, an objective lens driving apparatus 50 is viewed from the fixing part 7 side, while, in FIG. 5B, the objective lens driving apparatus 50 is viewed from the side opposite to the fixing part 7 side.

As illustrated in FIG. 5A, the first coil portion 5a of the tilt coil 5 is arranged at a position spaced apart from the reflection mirror 20 by the distance L in the tracking direction. In addition, as illustrated in FIG. 5B, part of the second coil portion 5b of the tilt coil 5, the part being near to the optical axis of the objective lens 1, is arranged at a position where the part of the second coil portion 5b is overlapped with the reflection mirror 20.

It is needed to arrange the moving part M in the objective lens driving apparatus 50 and the reflection mirror 20 so as to be spaced apart from each other, in order not to be brought into contact with each other when the moving part M moves. The reflection mirror 20 is fixed in a state of being an inclined surface that is inclined at approximately 45°. Accordingly, the place where the contact of the moving part M in the objective lens driving apparatus 50 with the reflection mirror 20 should be taken into consideration is a place close to the end 20a of the reflection mirror 20, the end 20a being near to the objective lens 1.

On the end 20b side of the reflection mirror 20, the side 20b being farthest from the objective lens 1, the moving part M in the objective lens driving apparatus 50 can be partially arranged in a space where the reflection mirror 20 is inclined, as far as the moving part M is not brought into contact with the reflection mirror 20 when the moving part M moves to the lowest side in the focusing direction.

In the present invention, the contact of the moving part M in the objective lens driving apparatus 50 with the reflection mirror 20 can be avoided, as stated above, by arranging the first coil portion 5a side of the tilt coil 5 at a position spaced apart from the reflection mirror 20 when the moving part M moves to the lowest side in the focusing direction. Accordingly, it becomes possible to sufficiently extend the second coil portion 5b of the tilt coil 5 toward the reflection mirror 20, and hence sufficient driving force can be obtained even with one piece of the tilt coil.

When a current is supplied to the focusing coil 3 in such an objective lens driving apparatus 50, driving force in the focusing direction is generated by an electromagnetic action with the magnets 11a through 11f, thereby allowing the moving part M to move in the focusing direction. When a current is supplied to the tracking coil 4, driving force in the tracking direction is generated by an electromagnetic action with the magnets 11a through 11f, thereby allowing the moving part M to move in the tracking direction. When a driving current is supplied to the tilt coil 5, driving force is generated in the tilt coil 5 by an electromagnetic action with the magnets 11c and 11f, thereby allowing the moving part M to move in the radial tilt direction.

The laser beam emitted from the laser emitting device 111, which is provided in the optical pickup 110 illustrated in FIG. 3, is condensed onto the optical disc by the objective lens 1. The condensed laser beam is reflected on the optical disc and then passes through the objective lens 1, to be incident into the photo detector 112 provided in the optical pickup 110.

A servo signal is detected from the signal acquired by the photo detector 112 and a driving signal is inputted, based on the servo signal, to the focusing coil 3 and the tracking coil 4 in the objective lens driving apparatus 50, thereby allowing positioning of the objective lens 1 to be controlled. Also, by inputting a driving signal to the tilt coil 5 to drive the objective lens 1 in the radial tilt direction, the relative inclination between the objective lens 1 and the optical disc is controlled. Also, a reproducing signal is detected from the signal acquired by the photo detector 112, thereby allowing the information on the optical disc to be reproduced.

Advantages of the embodiment according to the present invention, in which an optical pickup is configured as stated above, will be described, taking the conventional structure illustrated in FIGS. 6 and 7 as a comparative structure.

In the tilt coil 5 according to the invention, the driving force in the radial tilt direction is generated in the first coil portion 5a and the second coil portion 5b, which respectively face the magnets 11f and 11c.

Figure 6:
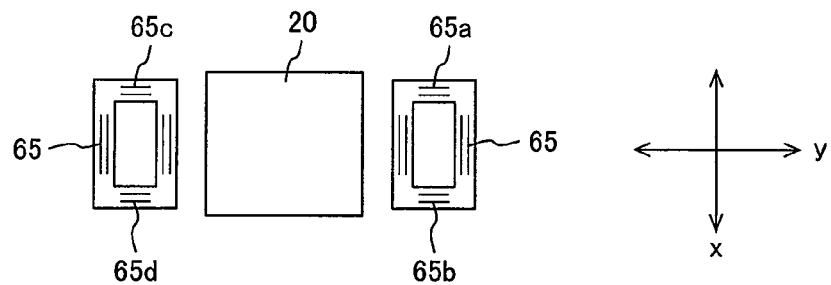
FIG. 6 is a view illustrating the positional relationship between a tilt coil and a reflection mirror according to a conventional example.
Figure 7:
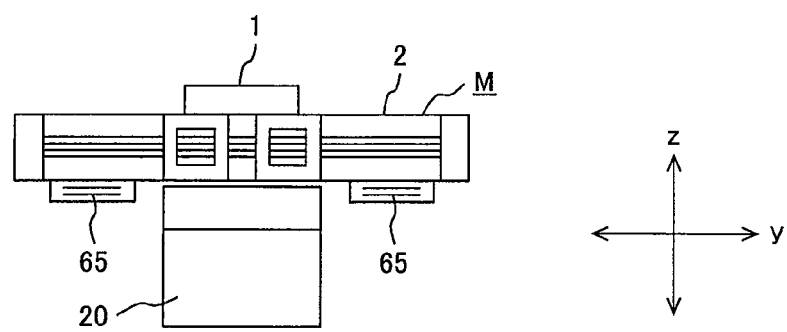
FIG. 7 is a view illustrating the positional relationship between a moving part and the reflection mirror according to the conventional example.

FIGS. 6 and 7 are views each illustrating the positional relationship between a tilt coil 65 and a reflection mirror 20 in a conventional objective lens driving apparatus.

FIG. 6 illustrates the positional relationship between the tilt coil 65 in the conventional objective lens driving apparatus and the reflection mirror 20, when viewed from above in the optical axis of an objective lens. FIG. 7 illustrates the positional relationship between the moving part M in the objective lens driving apparatus and the reflection mirror 20, when viewed from the tangential direction of an optical disc when the moving part M moves to the lowest side in the focusing direction.

As illustrated in FIG. 6, in the conventional objective lens driving apparatus, two pieces of tilt coils 65 each having a rectangular shape are arranged on the inner circumference side and on the outer circumference side in the tracking direction, the reflection mirror 20 being sandwiched by the both sides. In order for the tilt coil 65 and the reflection mirror 20 not to be brought into contact with each other when the moving part M moves, the tilt coil 65 is arranged at a position spaced apart from the reflection mirror 20, as illustrated in FIG. 7.

Herein, because the tilt coil 65 has a rectangular shape, it is arranged at a position spaced apart from the reflection mirror 20, when viewed from either the optical axis direction of the objective lens or the tangential direction of the optical disc. Driving force in the radial tilt direction is generated in coil portions 65a, 65b, 65c, and 65d of the tilt coil 65, the coil portions being parallel to the tracking direction.

The magnitude of the driving force, generated in a coil by a current supplied to the coil, is proportional to the length of the coil, when the magnetic flux that acts on the coil is assumed to be constant. Accordingly, it is effective to make the length of a coil to be large in order to increase the driving force generated in the coil.

When the tilt coil 5 illustrated in FIG. 4 is compared with the tilt coil 65 illustrated in FIG. 6, the length of the first coil portion 5a of the tilt coil 5 according to the present invention is almost the same as that of each of the coil portions 65a to 65d of the conventional tilt coil 65.

On the other hand, because the second coil portion 5b of the tilt coil 5 according to the present invention is longer than the first coil portion 5a, the second coil portion 5b of the tilt coil 5 according to the present invention is longer than each of the coil portions 65a to 65d of the conventional tilt coil 65.

Accordingly, the length of a coil portion per coil turn, by which driving force in the radial tilt direction is generated, becomes larger in the tilt coil 5 according to the present invention than in the conventional tilt coil 65. When the number of turns of the tilt coil 5 according to the invention is the same as the number of total turns of the conventional tilt coil 65, the driving force generated in the tilt coil 5 according to the invention becomes larger than that generated in the conventional tilt coil 65.

Subsequently, it will be described with reference to FIG. 8 that the thickness of the optical pickup 110 can be made small by arranging part of the second coil portion 5b of the tilt coil 5, the part being near to the optical axis of the objective lens 1, at a position where the part of the second coil portion 5b is overlapped with the reflection mirror 20.

Figure 8:
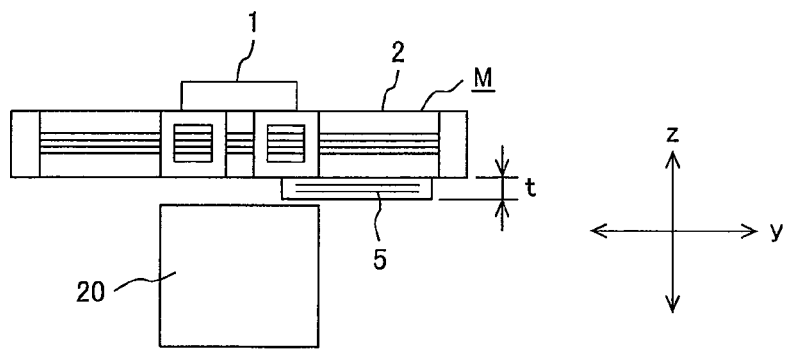
FIG. 8 is a view illustrating an advantage of the invention.

FIG. 8 illustrates the case where the tilt coil 5 is arranged at a position spaced apart from the reflection mirror 20 in the focusing direction, when viewed from the tangential direction of the optical disc when the moving part M in the objective lens driving apparatus 50 moves to the lowest side in the focusing direction.

Herein, FIG. 5 and FIG. 8 are compared with each other. In FIG. 8, the tilt coil 5 enters between the lens holder 2 and the reflection mirror 20 when the tilt coil 5 having a rectangular shape is simply made large, and hence the thickness of the optical pickup 110 becomes large by just that much. On the other hand, it can be known that, by arranging the tilt coil 5 at a position where it is overlapped with the reflection mirror 20, when viewed from the tangential direction of the optical disc as illustrated in FIG. 5, the height of the optical pickup 110 can be made small by the thickness t in the focusing direction of the tilt coil 5.

Subsequently, it will be described that, by providing one piece of the tilt coil 5 near to the outer circumference in the radial direction of the optical disc, the direction in which the optical disc is to be bent and the direction of a focusing movement of the objective lens 1 can be matched to each other, when the inclination of the objective lens 1 is controlled with respect to a bend of the optical disc.

Figure 9A:
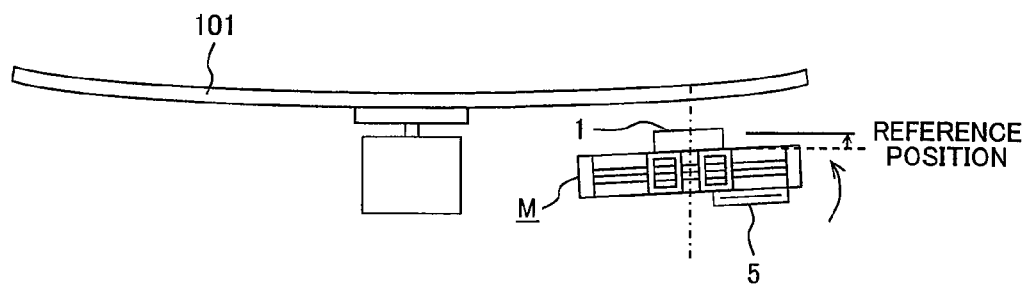
FIGS. 9A to 9C are views illustrating an advantage of the invention with respect to a bend of an optical disc.
Figure 9B:
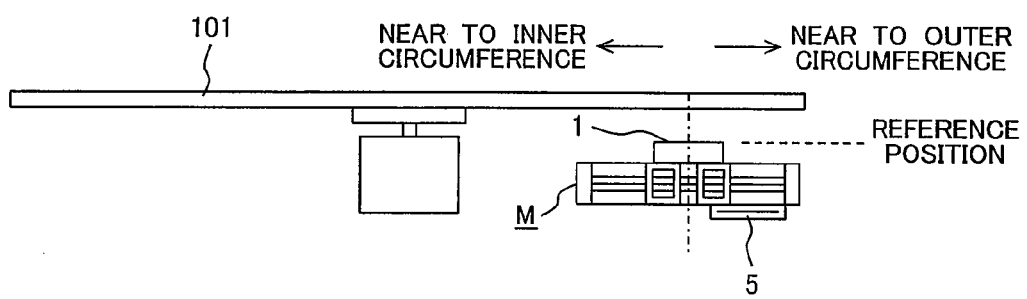
Figure 9C:
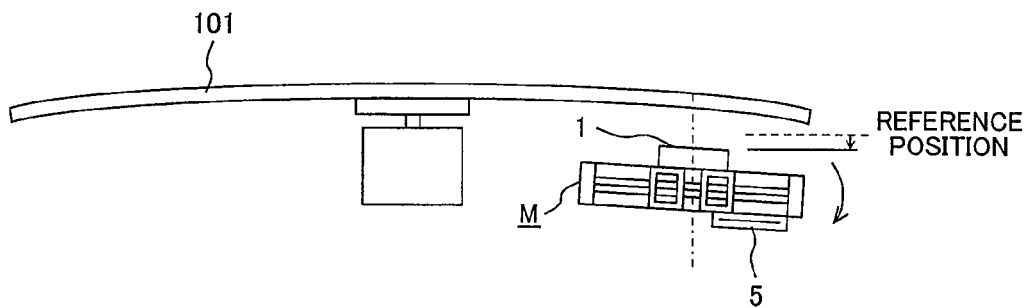

FIGS. 9A and 9C illustrate a bend of an optical disc 101 and movement of the objective lens 1, in which FIG. 9B illustrates the case where the optical disc 101 is not bent and the objective lens 1 is located at a reference position.

When the optical disc 101 is bent upward as illustrated in FIG. 9A, the relative inclination between the optical disc 101 and the objective lens 1 is controlled by inclining the objective lens 1 toward the inner circumference of the optical disc 101 in response to the bend of the optical disc 101. It is also needed to make the objective lens 1 move upward in the focusing direction in order to match the focal point of the objective lens 1 to the optical disc 101 that bends upward.

In the present invention, by generating driving force oriented upward in the focusing direction with the tilt coil 5 provided near to the outer circumference of the optical disc 101 with respect to the optical axis of the objective lens 1, the objective lens 1 can be inclined toward the inner circumference of the optical disc 101 with a rotational moment around the center of the support by the supporting members 6. At the time, the objective lens 1 moves upward in the focusing direction by the driving force oriented upward in the focusing direction, the driving force being generated in the tilt coil 5.

Conversely, when the optical disc 101 is bent downward as illustrated in FIG. 9C, the relative inclination between the optical disc 101 and the objective lens 1 is controlled by inclining the objective lens 1 toward the outer circumference of the optical disc 101 in response to the bend of the optical disc 101. It is also needed to make the objective lens 1 move downward in the focusing direction in order to match the focal point of the objective lens 1 to the optical disc 101 that bends downward.

In the present invention, by generating driving force oriented downward in the focusing direction with the tilt coil 5 provided near to the outer circumference of the optical disc 101 with respect to the optical axis of the objective lens 1, the objective lens 1 can be inclined toward the outer circumference of the optical disc 101 with a rotational moment around the center of the support by the supporting members 6. At the time, the objective lens 1 moves downward in the focusing direction by the driving force oriented downward in the focusing direction, the driving force being generated in the tilt coil 5.

Conversely to the present invention, when one piece of a tilt coil is provided near to the inner circumference in the radial direction of an optical disc, an objective lens moves in the focusing direction opposite to the bend of the optical disc, when the objective lens is inclined. It is needed to supply an extra current to a focusing coil in order to correct the position in the focusing direction, thereby increasing consumption power.

Accordingly, with a configuration in which one piece of the tilt coil 5 according to the present invention is provided near to the outer circumference in the radial direction of an optical disc, the power consumption of the objective lens driving apparatus 50, occurring when a radial tilt movement is performed, can be reduced.

As stated above, an optical pickup whose thickness is small and power consumption is low can be provided according to the present invention.

[Embodiment 2]

Subsequently, another embodiment of the present invention will be illustrated in FIGS. 10 and 11.

Figure 10:
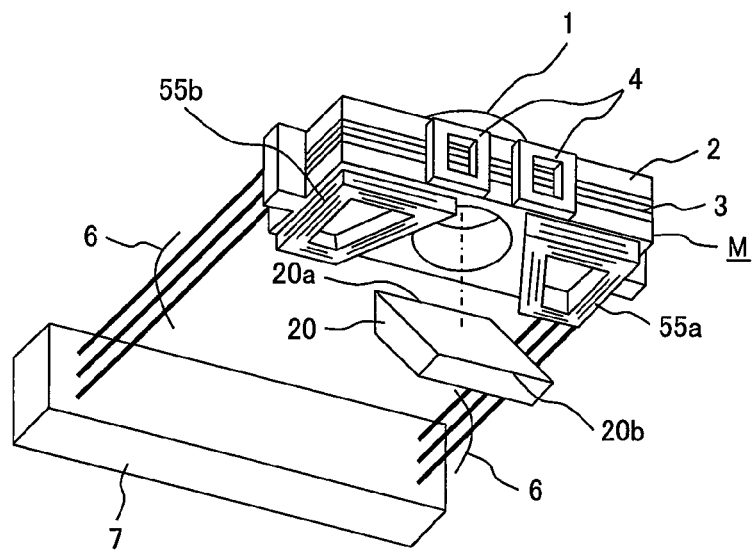
FIG. 10 is a perspective view of an optical pickup and an objective lens driving apparatus according to another embodiment of the invention.
Figure 10:
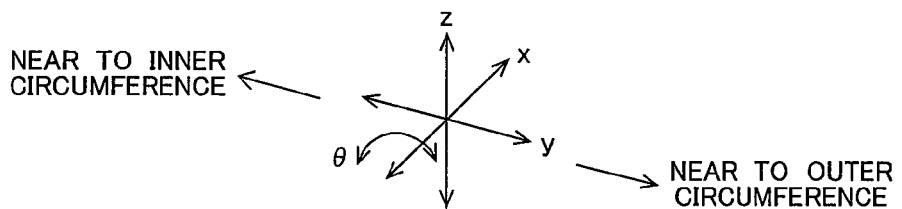

FIG. 10 is a perspective view of an optical pickup and an objective lens driving apparatus according to another embodiment of the present invention. FIG. 11 is a view illustrating a configuration of a tilt coil according to the other embodiment of the invention.

Figure 11:
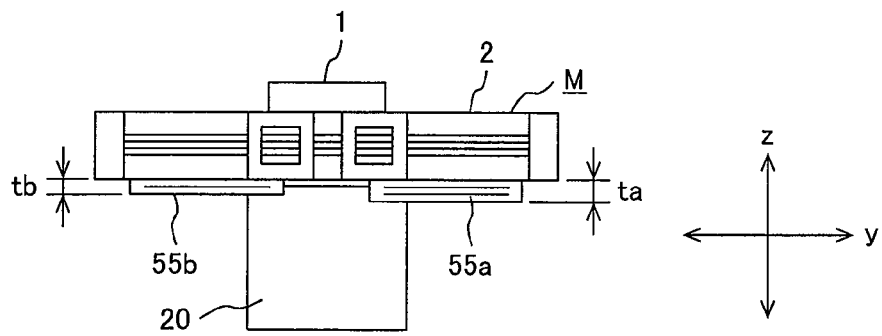
FIG. 11 is a view illustrating the configuration of a tilt coil according to the other embodiment of the invention.

In the present embodiment illustrated In FIGS. 10 and 11, as illustrated by tilt coils 55a and 55b, two pieces of tilt coils are arranged near to the inner circumference and near to the outer circumference in the radial direction of an optical disc, the tilt coils being provided on the lower surface of the lens holder 2. The two tilt coils are formed in such a way that the thickness ta in the focusing direction of the tilt coil 55a arranged near to the outer circumference is larger than the thickness tb in the focusing direction of the tilt coil 55b arranged near to the inner circumference, and that the number of turns of the tilt coil 55a provided near to the outer circumference is larger than that of the tilt coil 55b provided near to the inner circumference. Other configurations are the same as those in Embodiment 1.

With such a configuration, there is the advantage that it becomes easy to match the mass balance in the tracking direction of a moving part M to the geometric center of the moving part M, although an advantage of matching the moving direction of an objective lens driving apparatus to the bend of an optical disc is more decreased than that in Embodiment 1. Accordingly, vibrations, occurring due to a discrepancy of the mass balance of the moving part M, can be reduced.

According to the present invention, the driving force generated in a tilt coil can be increased by assuming that, of two coil portions of the tilt coil, the coil portion on the end side of a reflection mirror, the end being near to the objective lens, is a first coil portion and the other coil portion is a second coil portion, and by making the tilt coil have a trapezoidal shape in which the length of the second coil portion is larger than that of the first coil portion, as stated above.

Further, the height of the optical pickup can be made small by an amount equal to the thickness in the focusing direction of the tilt coil by arranging, when viewed from the optical axis of the objective lens, the first coil portion at a position spaced apart from the reflection mirror and the second coil portion at a position where part of the second coil portion is overlapped with the reflection mirror, so that, when viewed from the tangential direction of the optical disc when the lens holder moves to the lowest side in the focusing direction, the first coil portion is arranged at a position spaced apart from the reflection mirror and the second coil portion is arranged at a position where part of the second coil portion is overlapped with the reflection mirror.

What is claimed is:

1. An optical pickup comprising:
an objective lens for condensing light onto an optical disc;
a lens holder to which the objective lens has been attached;
a focusing coil, a tracking coil, and a tilt coil, which have been attached to the lens holder; and
a reflection mirror for reflecting light toward the optical axis of the objective lens,
wherein the tilt coil is made to have a shape in which the tilt coil is not brought into contact with a side of the reflection mirror, the side being near to the objective lens,
wherein part of the tilt coil on an end side of the reflection mirror, the end side being near to the objective lens, is assumed to be a first coil portion and of the tilt coil on the other end side thereof is assumed to be a second coil portion, and wherein the length of the second coil portion is larger than that of the first portion.

2. An optical pickup comprising:
an objective lens for condensing light onto an optical disc;
a lens holder to which the objective lens has been attached;
a focusing coil, tracking coil, and a tilt coil, which have been attached to the lens holder; and
a reflection mirror for reflecting light toward the optical axis of the objective lens,
wherein the tilt is made to have a shape in which the tilt coil is not brought into contact with a side of the reflection mirror, the side being near the objective lens,
wherein the tilt coil has a trapezoidal shape.

3. The optical pickup according to claim 1, wherein when viewed from the optical axis direction of the objective lens, the first coil portion is provided at a position spaced apart from the reflection mirror, and the second coil portion is provided at a position where part of the second coil portion near the optical axis of the objective lens is overlapped with the reflection mirror.

4. The optical pickup according to claim 1, wherein when viewed from a tangential direction of the optical disc when the lens holder moves to the lowest side in the focusing direction, the first coil portion is spaced apart from the reflection mirror, and part of the second coil portion near the optical axis of the objective lens is provided at a position where the part of the second coil portion is overlapped with the reflection mirror.

5. The optical pickup according to claim 1, wherein one piece of the tilt coil is provided near to the outer circumference in the radial direction of the optical disc with respect to the optical axis of the objective lens.

6. The optical pickup according to claim 1, wherein two pieces of the tilt coil are provided near to the outer circumference and near to the inner circumference in the radial direction of the optical disc, and the number of turns of the tilt coil near the outer circumference is larger than that of the tilt coil near the inner circumference.

* * * * *